United States Patent [19]

Geyer et al.

[11] Patent Number: 5,684,960
[45] Date of Patent: *Nov. 4, 1997

[54] REAL-TIME RING BANDWIDTH UTILIZATION CALCULATOR BY SAMPLING OVER A SELECTED INTERVAL LATCH'S STATES SET BY PREDETERMINED BIT PATTERN ON THE TRANSMISSION MEDIUM

[75] Inventors: Joel Erwin Geyer, Cary; Joseph K. Lee, Raleigh, both of N.C.

[73] Assignee: International Business Machines Corporation, Armonk, N.Y.

[*] Notice: The term of this patent shall not extend beyond the expiration date of Pat. No. 5,479,613.

[21] Appl. No.: 474,226

[22] Filed: Jun. 7, 1995

Related U.S. Application Data

[63] Continuation of Ser. No. 926,071, Aug. 5, 1992, Pat. No. 5,479,613.
[51] Int. Cl.[6] .................................................. H04L 12/26
[52] U.S. Cl. ........................... 395/200.11; 395/184.01
[58] Field of Search ...................... 395/200.11, 184.01; 379/133; 364/514 R, 514 B, 514 C

[56] References Cited

U.S. PATENT DOCUMENTS

| | | | |
|---|---|---|---|
| 4,200,771 | 4/1980 | Kraushaar et al. | 379/138 |
| 4,670,899 | 6/1987 | Brody et al. | 379/60 |
| 5,231,649 | 7/1993 | Duncanson | 375/260 |
| 5,479,613 | 12/1995 | Geyer et al. | 395/200.11 |

OTHER PUBLICATIONS

Logothetis et al. "Medium–Term Centralized Virtual–Path Bandwidth Control Based on Traffic Measurements", IEEE Transaction on Communications, V43 Iss10, 1995.

Jurgen Tusch "Testbed for a Token Ring Network" Local Computer Network 14th confernece, 1989.

Jurgen Tusch "Measurement on Real–Time Performance of a Token Ring Network" Computer and Communications, Int'l, 1990.

*Primary Examiner*—Thomas C. Lee
*Assistant Examiner*—D. Dinh
*Attorney, Agent, or Firm*—Joscelyn G. Cockburn

[57] ABSTRACT

An adapter which attaches Data Terminal Equipment (DTE) to a LAN includes a latch whose state is changed by conditions, such as a free token or a frame, on the LAN. The Output of the latch is used to calculate the bandwidth utilization of the LAN.

21 Claims, 6 Drawing Sheets

REAL-TIME RING BANDWIDTH UTILIZATION CALCULATOR BY SAMPLING OVER A SELECTED INTERVAL LATCH'S STATES SET BY PREDETERMINED BIT PATTERN ON THE TRANSMISSION MEDIUM

This application is a continuation of U.S. application Ser. No. 07/926,071, filed Aug. 05, 1992 now U.S. Pat. No. 5,479,613.

BACKGROUND OF THE INVENTION

1) Field of the Invention

The present invention relates to network management in general and in particular to devices which indicate the bandwidth usage in communications networks.

2) Prior Art

The use of LANs for interconnecting data terminal equipment (DTE) is well-known in the prior art. A conventional LAN includes a transmission medium (wire, fiber, etc.) to which a plurality of DTEs are connected. The exchange of information between DTEs are controlled by architectures and protocols associated with the particular LAN.

The popularity and use of LANs as an information distribution system have been increasing and will continue to increase. As a result, several steps have been taken to improve the reliability of the LAN. One major step is the standardization of architectures and protocols used in the LAN. The IEEE Project 802 Local Network Standards provides architectures and protocols for three types of LANs, namely; ETHERNET IEEE (802.3), Token Bus (IEEE 802.4) and Token Ring (IEEE 802.5). By standardizing the LANs, different manufacturers' equipment can communicate without the need of one manufacturer having detailed knowledge of the structure and/or operation of another manufacturer's equipment.

In addition to standardizing the network, several tools are required to measure various network functions and provide data which is used by a management station to control and optimize the operation of the network. Among the many tools is one which shows the utilization of the network at a given time. IBM Technical Disclosure Bulletin, Vol. 29, No. 12, May 1987 (pgs. 5419–5422) describes an apparatus and a technique for measuring utilization in a Token Ring Network. The apparatus includes an adapter with a modified front end chip (MFEC) and associated circuitry for calculating the ring utilization from the mathematical expression:

$$\text{Ring Utilization } (RU) = \frac{1 - \text{Ring latency}}{\text{Available Average Token Rate}}$$

where ring latency is the time between two consecutive free tokens and available average token rate is the time between free tokens. As will be explained below, a free token gives a station or DTE the right to transmit information on the network. A likely drawback with this system is that it is costly and it cannot be easily integrated into existing adapter hardware. This is so because the MFEC calls for a toroid (passive inductive connection) interfacing the adapter to the ring transmission media. The configuration is such that the ring transmission media passes through the toroid.

U.S. Pat. No. 4,943,979 describes a star controller for attaching to a bus network and to regenerate messages from the bus to multiple ports. The star controller includes a message relay logic which can be used to measure network bandwidth utilization by sampling the operating state of the message relay logic. The value of a counter can be read by message exchanges over a management link and software can determine the percentage of utilization from the count and from knowledge of sampling interval and rate. Among the deficiencies of this patent is the lack of detailed teaching to enable an artisan to implement the bandwidth measurement. In addition, the teachings may be applicable only to a bus type network.

SUMMARY OF THE PRESENT INVENTION

It is a general object of the present invention to provide a more efficient tool for measuring the utilization of a network.

It is a more specific object to provide a bandwidth utilization tool which is easily integrated into a device, such as an adapter, which attaches DTEs to a network.

It is another specific object to provide a bandwidth utilization tool in an adapter which attaches DTEs to a token ring network.

The above and other objects are achieved by incorporating into the adapter a utilization latch whose state is changed when a token message or a frame is sensed on the network. A controller samples the state of the latch over a selected time interval and the utilization of the ring is obtained from the mathematical expression:

$$U = O/TS \times 100\%$$

where U represents utilization of the ring, O represents the number of times the latch is in its "ON" state during the selected sample interval, and TS represents the total number of samples over the selected sample interval.

The foregoing features and advantages of the invention will be more fully described in the accompanying drawings.

DESCRIPTION OF THE PREFERRED EMBODIMENT

Figure 1:
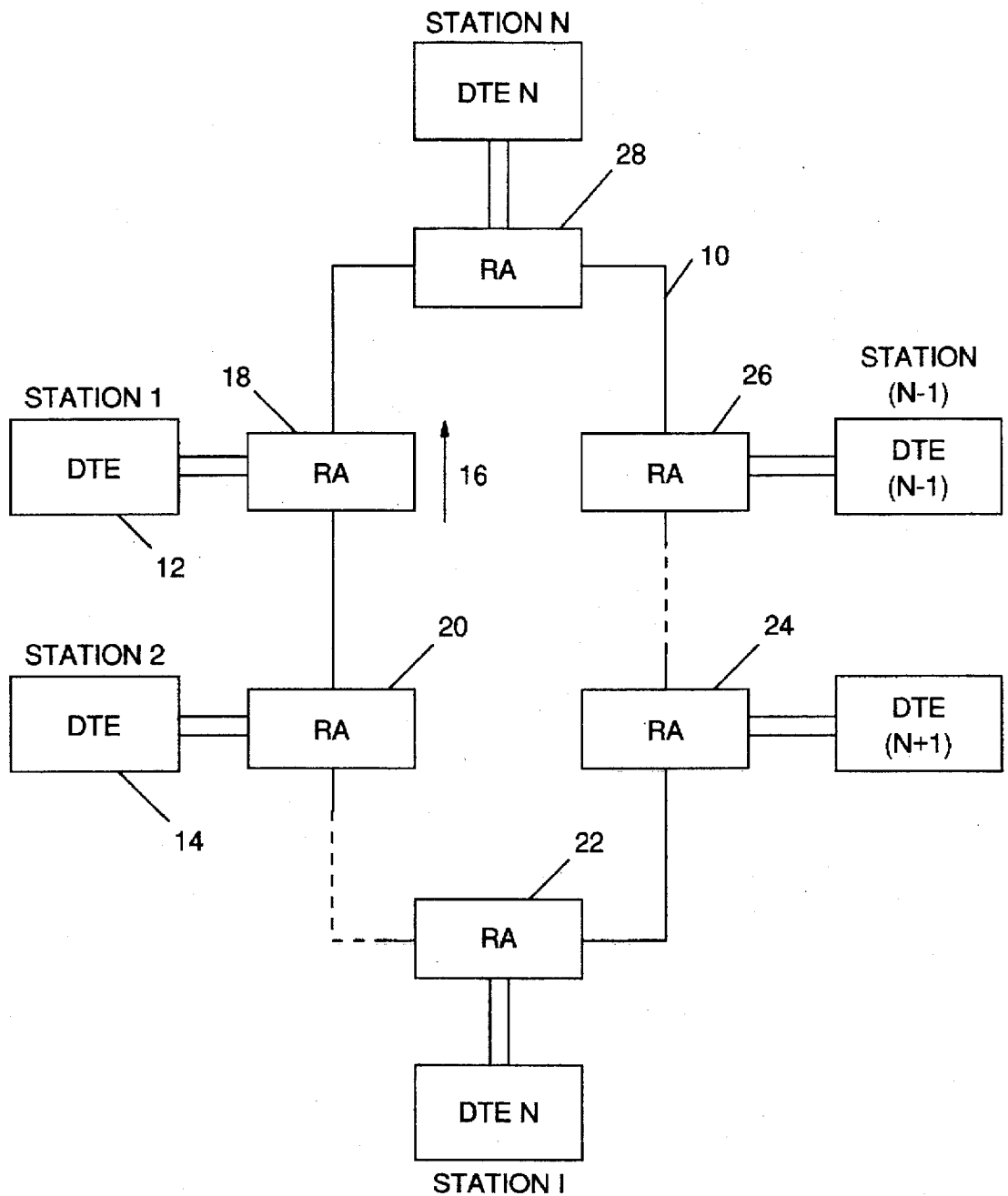
FIG. 1 is a block diagram of a ring communications system in which the present invention may be used.

FIG. 1 shows a serial loop communications system in which the present bandwidth utilization system according to the teachings of the present invention may be employed. The serial ring communications system includes a closed loop unidirectional transmission ring medium identified by numeral 10. The ring interconnects a plurality of data terminal equipment (DTE) or data terminal units (DTU) 12, 14 . . . i, i+1 . . . n−1 and n. Each data terminal unit may include one or more devices such as display terminals, personal computers (PCs), data collectors and telephone-type apparatus. .The function of the system is to exchange or distribute data between these devices. Data transmission in the system is unidirectional and may be in the direction shown by arrow 16. The data terminal equipment is connected to the ring by ring adapter 18, 20, 22, 24, 26 and 28, respectively. The structure and function of the ring adapters are identical. Their purpose is to receive data from and transmit data onto the ring. To this end, the ring adapter performs ring protocol functions which enable the free movement of data on the ring without impacting the design of the data terminal equipment. A detailed description of the ring adapter follows hereinafter. Suffice it to say, at this point, the ring adapter is provided with means that measure signal activities on the ring and calculate bandwidth utilization from the ring activity information.

Still referring to FIG. 1, data terminal equipment is connected to a ring adapter (RA). As stated before, data to and from the data terminal equipment is presented and extracted from the ring by the ring adapter. The ring adapter and its connected data terminal equipment are hereinafter referred to as a station. For example, station 1 includes data terminal equipment 12 and ring adapter 18. Likewise, station 2 includes data terminal equipment 14 and ring adapter 20 and so on. It should be noted that even though the ring adapter is shown as a separate entity from the station to which it is connected, this should be construed as exemplary only since, in reality, the adapter is mounted within slots provided within the unit which it connects to the network. For example, if the unit is a PC, then a slot in the PC motherboard would be dedicated to house the ring adapter.

Figure 3A:
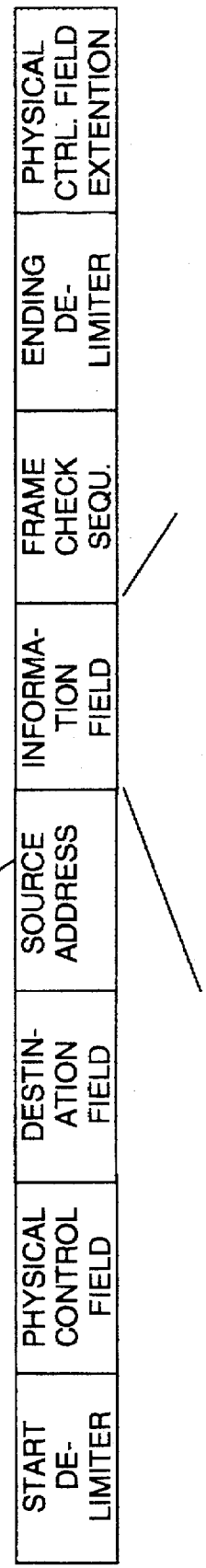
FIG. 3A shows the format for a frame on the ring communications system.
Figure 3B:
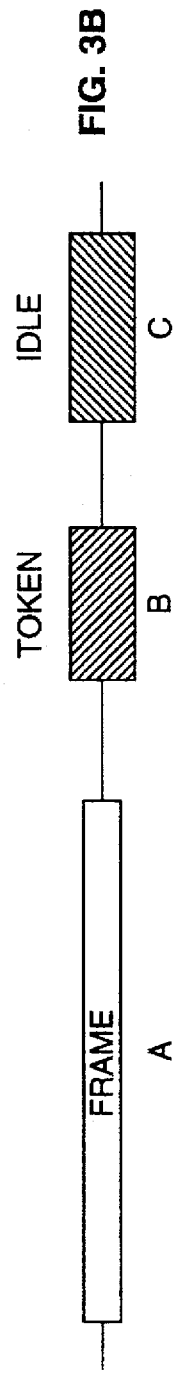
FIG. 3B shows a graphical representation of informational signals on the ring communications system.

Turning to FIG. 3B for the moment, there is shown a schematic of the types of data which is present on the commnications media 10 (FIG. 1). The types of data includes a frame A, token B and idle C. The frame A is the chief vehicle for shuttling information on the network. The token B is a control vehicle and gives a station the right to transmit information onto the network. Generally, when a station captures a free token it may insert data onto the network. Finally, the idle C is the vehicle that is used on the token ring network to keep the ring in sync when no data is being transmitted on the network. As will be explained subsequently, by detecting the type of information on the ring and using it to change the state of a latching mechanism, the utilization of the network bandwidth can be determined.

Referring to FIG. 3A, a format for frame A is shown. The frame includes a start delimiter (SDEL) and a physical control field (PCF). The start delimiter and the physical control field mark the beginning of the frame. As will be explained subsequently, there are control bits within the PCF field that are used in the present invention to determine the type of information that is on the network. The destination address (DA) field contains the address of the station to which the frame is being sent. There is also a source address (SA) field which contains the address of the station which originates the frame. The information field among other things contains the data which is exchanged between the frame. Finally, the frame check sequence (FCS) field contains the error checking information regarding the data integrity of the frame. The ending delimiter and physical control field extension represents the last elements of the frame structure.

Figure 2:
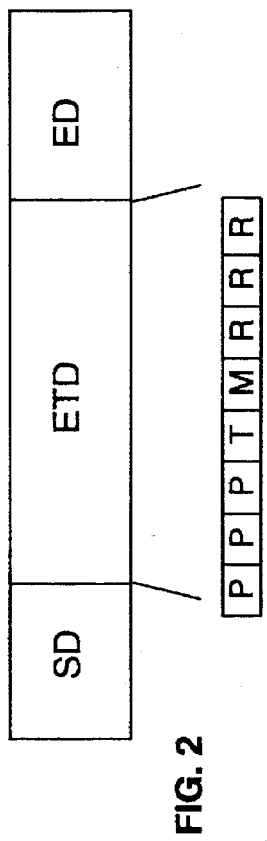
FIG. 2 shows the format for a token on the ring communications system.

FIG. 2 shows the structure for TOKEN B (FIG. 3B). Basically, the format includes a starting delimiter (SD) and an ending token delimiter (ED). The start delimiter is used to indicate the beginning of the token. Its contents is not germain to understanding the teachings of the present invention and, as such, will not be discussed any further. The ETD is a one octet field and contains control bits which are used in the teachings of the present invention to identify information types on the ring network. The first four bits in the ETD octet comprise three priority bits identified by alphabetical character P and a token bit identified by alphabetical character T. A similar set of bits with the same designation is provided in the physical control field of the frame shown in FIG. 3A. Depending on the setting of the T bit, it can be determined whether a frame or a token is on the network. In the preferred embodiment of this invention, when T is set to a logical "1", a frame is on the network. If T is set equal to a logical "0", a token is on the network. The pattern for idle on the network includes a series of 0 bits. This frame format (i.e., idle) is not relevant to the present invention and, as such, further discussion of this pattern will not be given.

The basic IEEE 802.5 standard for local area network requires an active ring to have a free token or frame present in the ring at any given time. The token indicates non-use of the ring while a frame indicates usage. As a result of this nomenclature, it is concluded that a lightly utilized ring will have free tokens (to be described subsequently) present most of the time. Similarly, the ring which is heavily utilized will have frames present most of the time. Based on this concept, the present invention provides a hardware entity which may be a latch or a bit in a register which is set to a first state when a free token is detected on the network and is reset to a second state when a frame is detected. Other reset conditions include corrupted tokens, ring clock errors and ring energy loss errors. A free token is defined as a zero priority (PPP=000) token. Since the state of the hardware entity indicates that actual utilization activities on the ring, a node or adapter processor or similar device can sample the hardware entity and statistically determine actual ring bandwidth utilization in a fixed period of time. The devices and methods for implementing this teaching will now be described.

Figure 4:
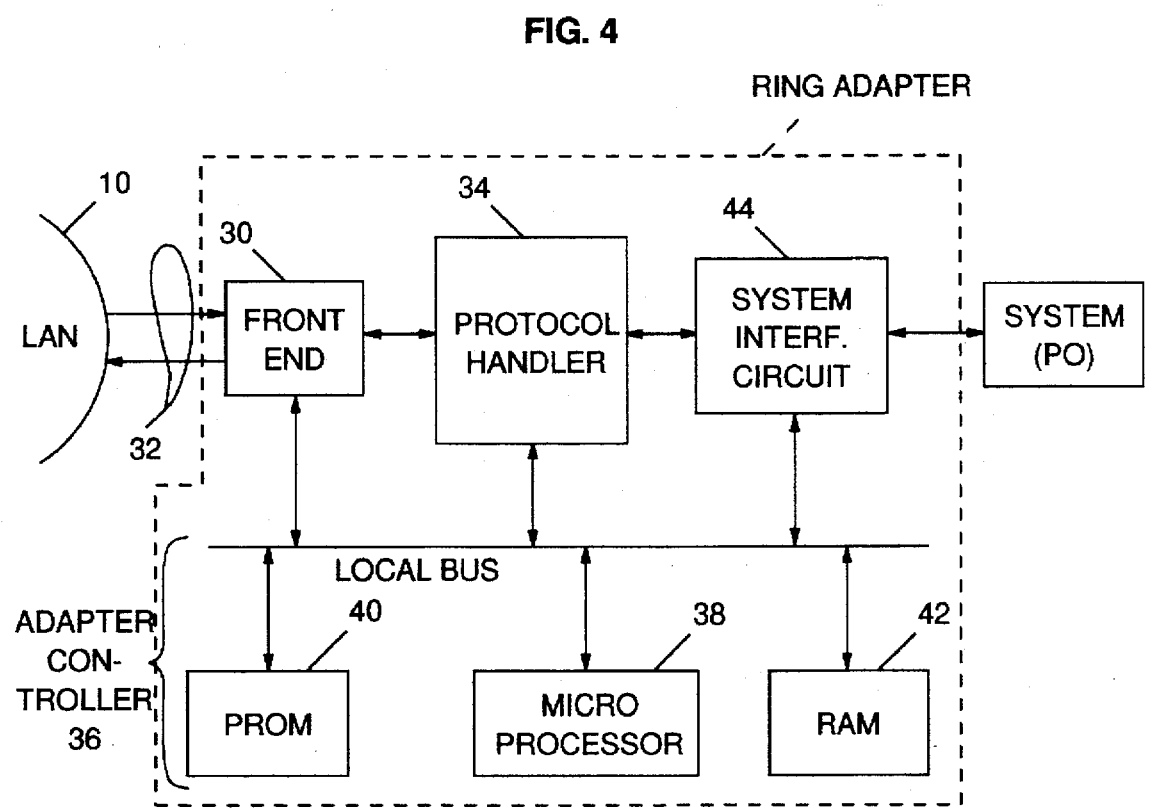
FIG. 4 shows a functional block diagram of the adapter according to the teachings of the present invention.

FIG. 4 shows a functional block diagram of the ring adapter according to the teachings of the present invention. As stated previously, the ring adapter attaches a system such as a personal computer (PC) to transmission medium 10 of a LAN. The ring adapter includes a front end 30 interconnected by appropriate means 32 to transmission medium 10. The appropriate means may include an adapter. The front end 30 is connected by appropriate means to protocol handler 34 and adapter controller 36. In the preferred embodiment of this invention, the adapter controller 36 includes a microprocessor 38 coupled via a local bus to PROM 40 and RAM 42. The microprocessor is a programmed microprocessor which has its control program embedded in PROM 40. The RAM 42 provides a data storage buffer for the protocol handler. The protocol handler 34 is interconnected to system interface circuit 44. The system interface circuit 44 interconnects the ring adapter to the system such as a PC. As will be explained subsequently, the hardware entity for measuring activities on transmission media 10 is provided in protocol handler 34 while the calculation to determine usage of the ring is performed by the adapter controller 36.

Still referring to FIG. 4, front end 30 provides communications with the transmission media 10. To this end, it includes a grouping of electronic circuitry which performs electrical signal conversion on data which is to be transmitted on or received from transmission medium 10. Such signal conversion may include modulation and demodulation, etc. The protocol handler 34 processes data in accordance with the architecture and protocol of the LAN. The protocol for token ring LAN which is provided by the protocol handler 34 is set forth in the IEEE 802.5 Standard for Local Area Networks. This standard is well-known in the art and, as such, a detailed description of the protocol handler 34 will not be given. Finally, system interface circuit 44 processes data so that it is acceptable for use by the protocol handler and/or the system which the adapter attaches to the LAN. The adapter controller 36 provides calculation and other logical and/or arithmetical functions which allows the front end 30, protocol handler 34 and system interface circuit 44 to carry out their respective functions. More detailed description of generic sections of an adapter is set forth in U.S. Pat. No. 4,507,777 (assigned to the assignee of the present invention), the IEEE 802.5 Standard For Local Area Networks and IBM® Technical Reference For Token Ring Network PC adapter (6165876).

Figure 5:
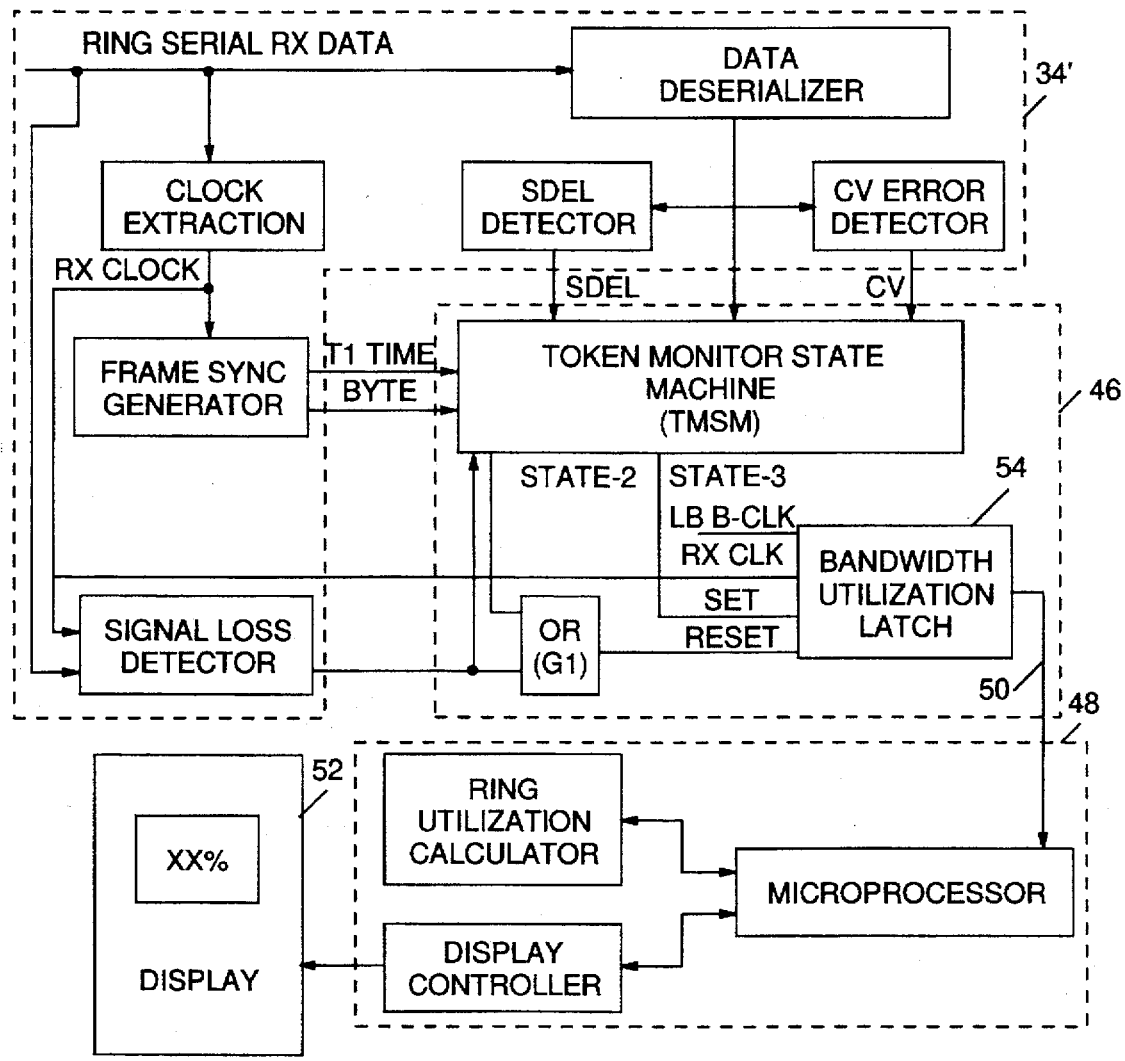
FIG. 5 shows a block diagram of the ring bandwidth utilization system according to the teachings of the present invention.

FIG. 5 shows a block diagram of a system for measuring the ring utilization according to the teachings of the present invention. The system includes a circuit arrangement 34' which receives serial data from the ring and output control signals for driving a hardware system 46 which outputs on conductor 50 signal representative of signal activity on the network and a calculator 48 which monitors the signal on conductor 50 and generates utility information which is provided on display 52.

Still referring to FIG. 5, the hardware system 46 includes a bandwidth utilization latch 54 which is set by state 3 of a Token Monitor State Machine (TMSM). The detail of the TMSM will be described subsequently. The bandwidth utilization latch 54 is reset through OR gate (G1) by state 2 of the TMSM or signal loss on the ring detected by Signal Loss Detector. In essence, the bandwidth utilization latch 54 is set to a first state, say logical "ON", when a token is sensed on the ring. The latch is reset when signal loss is detected by the Signal Loss Detector or a frame is detected by token monitor State Machine. The output of the bandwidth utilization latch is sampled by the microprocessor which provides signals to the ring utilization calculator and the display controller to output the percentage utilization of the ring bandwidth on the display 52.

Figure 6:
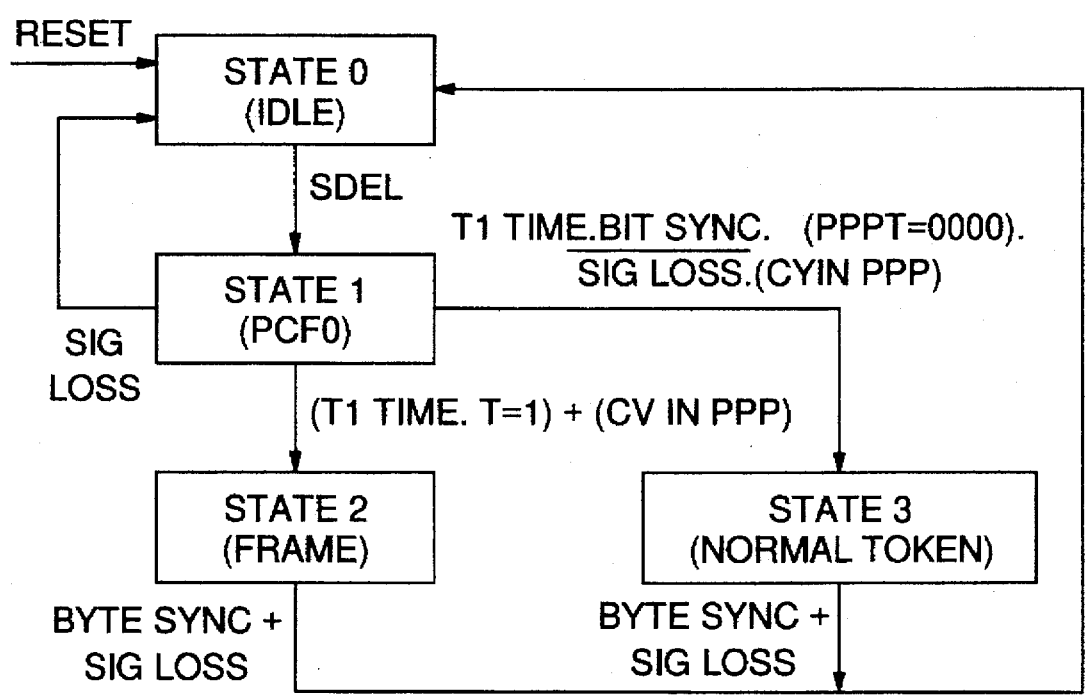
FIG. 6 shows a block diagram of a token monitor state machine.

Turning to FIG. 6 for the moment, a state diagram describing the logic flow in the Token Monitor State Machine is shown. The TMSM includes four states. At power-on reset, STAT-0 (idle state) will be active indicating the TMSM is in its static idle state. Once the SDEL Detector detects the starting delimiter (SDEL) of a token or frame, the TMSM exits from state 0 to state 1. At the token indicator (TI) bit time (4th bit in the physical control field 0 (PCF0 byte) (FIG. 2), if PPPT =0000 (normal free token), the TMSM exits from state 1 to state 3 which sets the bandwidth utilization latch 54 (FIG. 5). The logical conditions which causes the state machine exists from state 1 to state 3 is shown beside the line interconnecting state 1 to state 3. If TI=1 (indicating the presence of a frame) or code violations are detected in the PPP bits (indicating a corrupted token or frame) the TMSM exits from state 1 to state 2. The state 1 and the state 3 branches back to state 0 at the byte boundary of the PCF0 byte. In addition, any time the signal loss detector (FIG. 5) detects a signal loss condition in state 1, 2 or 3, the TMSM returns to state 0. In this description, signal loss is defined as ring clock error or ring energy loss error. Returning again to FIG. 5, the bandwidth utilization latch 54 is implemented with a LSSD set/reset latch. As stated above, the state of the utilization latch can be represented by a bit or other logical entity in a register. The B and C clock inputs of the latch are fed by the RX clock and local bus B-clock (LB B-LK) respectively.

A token or frame is received in the adapter as serial data stream shown on the conductor labeled RING SERIAL RX DATA. The signal includes clock and data information. The clock extraction block recovers the ring receive clock (RX CLOCK) from the serial data and forwards it to the frame sync generator block. This block generates all frame synchronization signals including TI time and byte which serve as input variables for the TMSM. The data deserializer block changes the serial data into parallel data bits which the SDEL Detector and CV Error Detector use to detect the SDEL and code violation (CV) signals, respectively. The SDEL and CV signals are also input variables to the TMSM. The Signal Loss Detector detects any ring clock error or ring energy loss error. The output of the Signal Loss Detector and state-2 output of the TMSM are ORed in G1 before connected to the reset input of the bandwidth utilization latch. The state 3 output of the TMSM is connected to the set input of the latch.

The state of the Bandwidth Utilization Latch 54 which is polled or sampled periodically by the microprocessor in calculator means 48 to determine the real ring bandwidth utilization. The calculated result is fed to the display controller which displays the result in the form of a percentage to the user.

Figure 7:
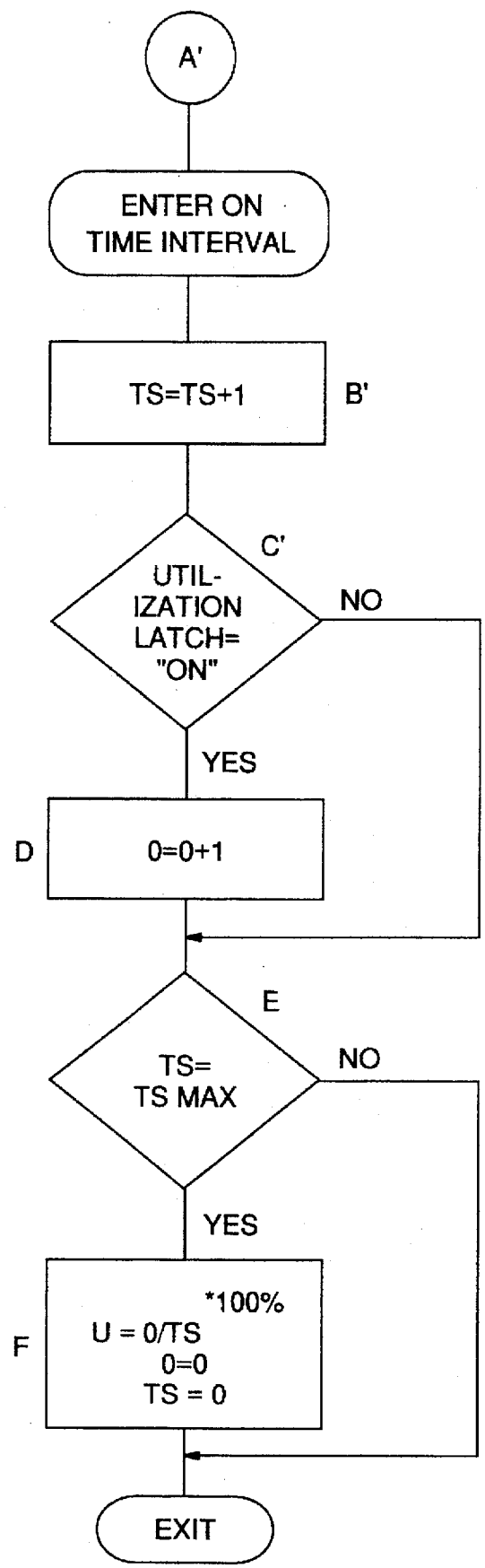
FIG. 7 is a flow chart for programming a microprocessor to calculate ring bandwidth utilization.

FIG. 7 shows a flow chart that can be used to calculate the bandwidth utilization using the formula U=O/TS * 100% by sampling the output of the utilization latch. Not shown in the flow chart is the initialization of the variables to a known state at the start. These variables are U, O, and TS and they were all initialized to 0.

At regular timed intervals, the flow chart is entered at a'. Upon entry, the variable TS is incremented by 1 (block B'). The state of the utilization latch is sampled (block C') and, if it is "on", the variable O is incremented (block D). Then TS is examined to determine if the total number of samples has reached its predetermined maximum (block E). If the maximum has been reached, then the variable U is calculated and variables O and TS are reset to 0 to start the sampling for the next interval (block F).

While the sampling is occurring for the next interval, the variable U will contain the bandwidth utilization calculated for the previous interval. When TS reaches the maximum number of samples, then the utilization measurement will be updated.

The following advantages are provided by the above-described invention. The bandwidth utilization feature is provided at a relatively low cost. It is implemented in the adapter hardware and provides real time measurement.

While the invention has been particularly shown and described with reference to a preferred embodiment thereof, it will be understood by those skilled in the art that various changes in form and details may be made therein without departing from the spirit and scope of the invention.

Having thus described our invention, what we claim as new and desire to secure by Letters Patent, is:

1. An improved circuit arrangement for measuring bandwidth utilization in a communications network including a common transmission medium to which at least one Data Terminal Equipment DTE is connected, said circuit arrangement comprising:

a storage means;

a first circuit means, operatively coupled to the transmission medium, said first circuit means monitoring signal transmissions on the transmission medium, generating a first control signal which sets the storage means in a first state if a first predetermined bit pattern is detected on said transmission medium and generating a second control signal which sets the storage means in a second state if a second predetermined bit pattern is detected on said transmission medium; and a controller means for monitoring the storage and generating a profile representative of state changes of said storage means and selectively using said state changes to calculate the bandwidth utilization.

2. The improved circuit arrangement of claim 1 further including a system interface circuit for interfacing the improved circuit arrangement to a user system.

3. The improved circuit arrangement of claim 1 further including a display means coupled to the controller means for displaying indicia representative of bandwidth utilization on said communications network.

4. The improved circuit arrangement of claim 1 wherein the communications network includes a token ring network.

5. The improved circuit arrangement of claim 1 wherein the user system includes a PC.

6. The improved circuit arrangement of claim 1 further including a connector to couple the first circuit to the communication network.

7. The improved circuit arrangement of claim 1 wherein the first predetermined bit pattern includes a token.

8. The improved circuit arrangement of claim 1 wherein the second bit pattern includes a frame.

9. The improved circuit arrangement of claim 1 wherein the storage means includes a latch.

10. The improved circuit arrangement of claim 1 further including a front end interface means for coupling to the transmission medium.

11. The improved circuit arrangement of claim 1 wherein the controller means includes a programmed microprocessor.

12. The improved circuit arrangement of claim 1 wherein the bandwidth utilization is calculated as a percentage.

13. In a serial communications network having a closed loop transmission medium on which informational signals are transmitted serially and one or more DTEs connected through separate interface devices to said closed loop transmission medium, a circuit arrangement for measuring bandwidth utilization of said serial communications network comprising:

a latch for storing time sensitive data representative of predetermined bit pattern on said closed loop transmission media;

a first circuit means operatively coupled to the transmission medium, said first circuit means monitoring data transmission on the transmission medium, generating a first control signal which sets the latch in a first state if a first predetermined bit pattern is detected on said transmission medium and generating a second control signal which sets the latch in a second state if a second predetermined bit pattern is detected on said transmission medium; and a programmed microprocessor for sampling the latch over selected time intervals and calculating bandwidth utilization from mathematical expression $$U = O/TS \times 100\%$$

where U represents utilization of the loop communications medium, O represents number of times the latch is in its "ON" state during a selected sample intervals and TS represents the total number of samples taken in the selected sample intervals.

14. The circuit arrangement of claim 13 wherein the first predetermined bit pattern includes a token.

15. The circuit arrangement of claim 13 wherein the second predetermined bit pattern includes a frame.

16. A method for measuring total bandwidth usage in a Local Area Network (LAN) having a transmission medium and a plurality of stations connected to said transmission medium, with a station being permitted to transmit a frame onto said transmission media only if said station is in possession of a Token, said method comprising the steps of:

(a) providing a memory device in at least one of the stations;

(b) monitoring the transmission medium to detect signal activities thereon;

setting the memory device to a first logical state if a first predetermined bit pattern is detected on said transmission medium;

resetting the memory device to a second logical state if a second predetermined bit pattern is detected on said transmission medium;

determining frequency of occurrence for each logical state of the memory device over a selected time period; and using the frequency for at least one of the logical states to calculate the total bandwidth usage for all the stations which are active in said LAN.

17. The method of claim 16 wherein each logical state includes logical "0" and logical "1".

18. The method of claim 18 wherein the first predetermined pattern includes a free Token.

19. The method of claim 16 wherein the second predetermined pattern includes a frame.

20. The method of claim 16 further including the steps of generating optical indicia representative of the total bandwidth usage; and displaying said optical indicia to a user.

21. An adapter for use in a Local Area Network LAN having a transmission medium and a plurality of Personal Computers PCs each one connected through the adapter to the transmission medium, said adapter comprising:

a system interface circuit arrangement for coupling to a bus of one of the PCs;

a front end circuit arrangement for receiving information from and transmitting information onto said LAN; and a utilization device for, measuring total bandwidth use resulting from all active stations connected to said LAN, said utilization device including a memory, a first circuit arrangement for monitoring the transmission media, for generating a first control signal which sets the memory to a first state if a first predetermined bit pattern is detected and generating second control signal which resets the memory to a second state if a second predetermined bit pattern is detected; and a controller, responsive to frequency of logical state settings of said memory to calculate total bandwidth usage for all active stations on said LAN.

* * * * *